United States Patent
Saeki et al.

(10) Patent No.: US 6,639,797 B2
(45) Date of Patent: Oct. 28, 2003

(54) COMPUTER HAVING COOLING DEVICE

(75) Inventors: Masayuki Saeki, Hadano (JP);
Hironori Oikawa, Hadano (JP);
Takeshi Hizono, Yokohama (JP)

(73) Assignee: Hitachi Ltd., Tokyo (JP)

( * ) Notice: Subject to any disclaimer, the term of this patent is extended or adjusted under 35 U.S.C. 154(b) by 0 days.

(21) Appl. No.: 10/196,145

(22) Filed: Jul. 17, 2002

(65) Prior Publication Data

US 2003/0184972 A1 Oct. 2, 2003

(30) Foreign Application Priority Data

Mar. 27, 2002 (JP) ........................................ 2002-087381

(51) Int. Cl.⁷ ................................................ H05K 7/20
(52) U.S. Cl. ..................... 361/698; 361/694; 361/695; 361/696; 361/699; 174/15.1; 165/80.4
(58) Field of Search ................................ 361/688–695, 361/696–700; 257/714, 721, 722; 174/15.1, 15.2, 16.1, 16.3, 252; 165/80.3, 80.4, 104.33, 122

(56) References Cited

U.S. PATENT DOCUMENTS

| | | | | |
|---|---|---|---|---|
| 5,088,006 A | * | 2/1992 | del Puerto et al. | 361/699 |
| 6,118,655 A | * | 9/2000 | Mecredy et al. | 361/687 |
| 6,315,033 B1 | * | 11/2001 | Li | 165/104.33 |
| 6,327,145 B1 | * | 12/2001 | Lian et al. | 361/697 |
| 6,343,478 B1 | * | 2/2002 | Chang | 62/259.2 |
| 6,487,076 B1 | * | 11/2002 | Wang | 361/697 |
| 6,499,533 B2 | * | 12/2002 | Yamada | 165/80.1 |

* cited by examiner

*Primary Examiner*—Boris Chervinsky
(74) *Attorney, Agent, or Firm*—Antonelli, Terry, Stout & Kraus, LLP

(57) ABSTRACT

In an information processing apparatus with a cooling structure using a heat transport measure such as a heat pipe and a liquid-cooling system, a heat radiation unit has reduced thickness and noise and an improved efficiency. Heat generated by a CPU is transmitted through a heat receiving header and a flexible tube to the heat radiation unit by liquid coolant transported by a pump. The heat radiation unit comprises a propeller, a wall surface in contact with the propeller, and a cooling pipe spirally wound around a propeller shaft in a plane perpendicular to the propeller shaft. Hot coolant is circulated so as to enter the central portion of the cooling pipe and to be discharged from the outer peripheral portion of the pipe. The cooling air from the propeller is made to flow from the central portion of the cooling pipe toward its peripheral portion. The cooling pipe is thermally connected to the wall surface so that the wall surface works as a heat spreader.

19 Claims, 7 Drawing Sheets

FIG.1

DIRECTION OF
LIQUID COOLANT FLOW

COMPUTER HAVING COOLING DEVICE

BACKGROUND OF THE INVENTION

The present invention relates to a cooling structure for computers with heat generating components such as CPUs, and more particularly to a cooling device suitable for use in a cooling system that employs a heat transport and radiation means using a coolant, such as a heat pipe and a liquid-cooling system.

In recent years, devices and integrated circuits used in information processing apparatuses, such as personal computers and servers, tend to generate an increasing amount of heat because of their ever-increasing integration degree. CPUs in particular show a significant increase in the amount of heat produced because of their faster operation frequencies and enhanced integration.

Conventional personal computers and servers commonly employ, to cool the CPU generating much heat, a method of attaching a heat sink to the CPU to transfer the generated heat of the CPU to the heat sink and cooling the heat sink. Further, to dissipate heat to the outside of the computer, a cooling fan may be provided in the equipment for forced cooling.

To deal with an ever-increasing amount of heat generated by the CPU, the cooling capacity is enhanced by enlarging the heat sink and increasing the airflow of the cooling fan. The enlarged heat sink, however, leads to an increase in the size of the computer and the increased airflow of the cooling fan also results in a size increase of the computer due to the enlarged cooling fan. The airflow may be increased by increasing the revolution speed of the fan, but this method tends to increase fan noise.

Methods of radiating heat generated by CPU or the like that replace the heat sink include a heat pipe and a liquid-cooling system that transport heat by a coolant. These methods feature an increased degree of freedom in the structure because the coolant is cooled at a location remote from a heat-generating source such as CPU. In a case where a cooling fan is used to radiate the coolant-carried heat outside the equipment, however, problems similar to those described above arise.

Various methods have been proposed as solution for these problems. For example, JP-A-2000-154949 discloses a technique for thinning a cooling unit by arranging heat radiation fins with thermoelectric elements interposed therebetween around the outer circumference of a centrifugal fan. JP-A2000-77877 discloses a technique for reducing the thickness of a cooling unit by using a centrifugal fan thinner than heat generating parts. Further, JP-A-10-213370 discloses a technique for securing a necessary cooling air flow by transporting heat generated by the heat source such as CPU to a location near the power supply by means of a liquid-cooling system and then cooling a heat-carrying medium by a larger power supply fan.

SUMMARY OF THE INVENTION

When the conventional techniques described above are used to deal with the recent trend for an ever-increasing amount of heat generated by the CPU, the following problems are observed. In JP-A-2000-154949, for example, the cooling air is not directly applied to the heat-generating component but is applied to the fins. Hence, if the fin height is limited for the thinning, there is a limit on the cooling performance. Further, in JP-A-2000-77877, a fan thinner than the heat generating component is required and this makes it difficult to secure a necessary air flow of the fan, imposing a limit on the cooling performance. JP-A-10-213370, on the other hand, requires increased thicknesses of the fan and heat exchanger, making it difficult to reduce the thickness of a cubicle or case.

In a computer with a cooling structure using a heat transport measure such as a heat pipe and a liquid-cooling system, it is an object of the invention to provide a cooling system for the computer, which realizes a reduced thickness and an improved efficiency of a heat radiation unit.

To the above objective, a cooling device for radiation through a coolant to the outside heat generated by such heat generating portions as CPU in a computer comprises a heat receiving unit for transmitting the heat generated by a heat generating portion such as CPU to the coolant, and a heat radiation unit for dissipating the heat stored in the coolant to the outside by a radiator in which the coolant is filled. The heat-receiving unit and the heat radiation unit are connected together through a tube so that the coolant can circulate between them. The heat transferred to the coolant in the heat-receiving unit is dissipated to the outside by the heat radiation unit. Further, the heat radiation unit is arranged parallel to a printed circuit board on which the heat generating portion such as CPU is mounted, in order to increase a heat dissipating area of the radiator and therefore the amount of heat radiated. In this construction the coolant circulating through the tube absorbs heat, which was generated by the heat generating portion such as CPU and collected by a heat receiving head, and dissipates it outside through the radiator of the heat radiation unit.

The radiator has a cooling pipe, which contains the coolant, formed in a spiral or radial shape so that the coolant can flow from the central portion of the radiator toward its outer peripheral portion. With this construction, the heat from the heat-generating portion can be diffused from the central portion of the radiator toward the peripheral portion and dissipated from the radiator surface.

Further, the central portion of the radiator is provided with a cooling fan or a cooling air blowing opening for the forced cooling of the radiator. The cooling air is delivered perpendicularly to the radiator and the direction of airflow is changed on the radiator surface toward the circumferential direction. Alternatively, a centrifugal fan is used to generate a cooling airflow in the circumferential direction along the radiator surface. As a result, although the air flow speed decreases as the air flow nears the peripheral portion of the radiator, the forced cooling can be performed with high efficiency because the coolant also flows from the central portion toward the peripheral portion.

Further, a path of the cooling air is formed in one of the following two ways. One is to arrange the radiator on a side of the cooling unit where the CPU and so forth are mounted and thereby form the path between the radiator and the external case of the cooling unit. Another is to arrange the radiator in contact with the external case to form a gap for the cooling airflow path in the cooling unit.

In the latter case, not only can the radiator be forcibly cooled by the cooling air but the heat can also be dissipated by a natural convection through the external surface of the case. When the cooling air is delivered from the heat-generating portion on the CPU side, the cooling fan in the computer can also be used as the radiator cooling fan.

Other objects, features and advantages of the invention will become apparent from the following description of the embodiments of the invention taken in conjunction with the accompanying drawings.

DETAILED DESCRIPTION OF THE PREFERRED EMBODIMENTS

Embodiments of the present invention will be now described in detail by means of the accompanying drawings.

Figure 1:
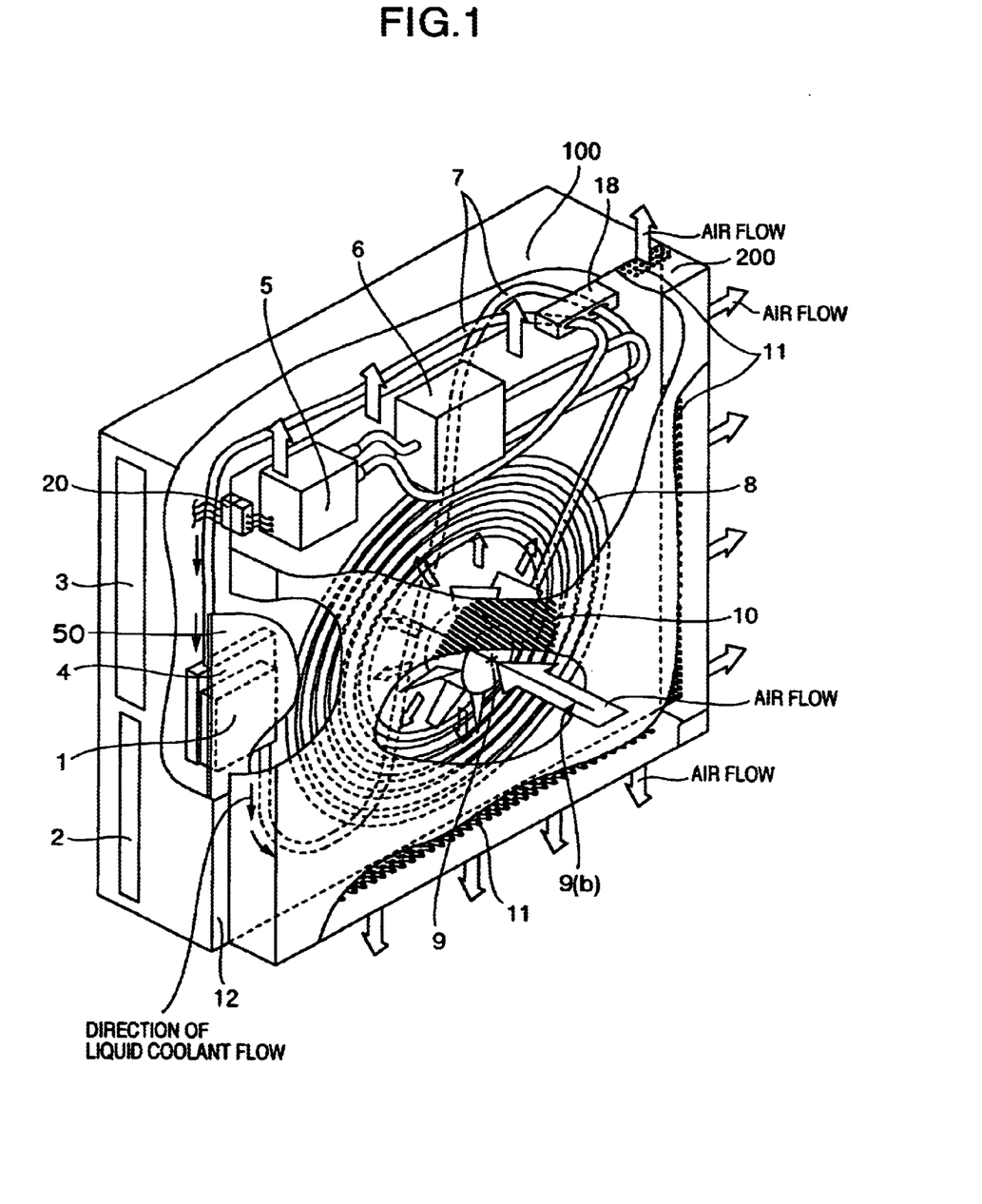
FIG. 1 is a perspective view showing an embodiment of the invention.

FIG. 1 shows an embodiment in which the invention is applied to a desktop PC (of slim tower type). The desktop PC comprises a PC system unit 100 and a heat radiation unit 200. The PC system unit 100 includes devices, such as a CD-ROM drive 3 and a FD drive 2, a CPU 1 and a printed circuit board 50 mounting the CPU 1. The CPU 1 generates a large amount of heat and thus is attached with a heat-receiving header 4 for cooling. The heat radiation unit 200 comprises a pump 5, a reserve tank 6, a flexible tube 7, a propeller 9, and a cooling pipe 8 wound in spiral around a propeller shaft 9b as a center. A radiator with a heat dissipation function is comprised of the cooling pipe 8 as detailed in the following.

Individual parts will be briefly explained as follows. The heat-receiving header 4 is attached to the CPU 1 mounted on the printed circuit board 50. The CPU 1 and the heat receiving header 4 are held in intimate contact, with a thermal compound or highly thermally conductive silicone rubber interposed therebetween, so that the heat produced by the CPU 1 can be efficiently transmitted to the heat receiving header 4. The heat-receiving header 4 has a liquid coolant flowing therethrough so that the heat of the heat-receiving header 4 is transferred to the coolant. In this embodiment the heat receiving header 4 measures 40 mm long by 40 mm wide by 5 mm high and has a capacity of transferring 80 W or more of heat from the CPU to the coolant. The flexible tube 7 connects the heat receiving header 4 to the cooling pipe 8 and allows the coolant to flow in the tube thus constituting a heat transport path between the heat receiving header 4 and the cooling pipe 8. In this embodiment the tube used is 4 mm in inner diameter and 6 mm in outer diameter.

Next, the heat radiation unit 200 will be explained. The pump 5 circulates the liquid coolant between the heat receiving header 4 and the cooling pipe 8. As for the direction of coolant flow, the coolant is drawn from the cooling pipe 8 and discharged to the CPU 1 side. This arrangement ensures that the coolant after being cooled flows into the pump 5 thus preventing the heating of the pump 5. In this embodiment, the pump is an ultra-small pump with a capacity of 200 mL/min. The pump 5 may have a variable flow control function based on a temperature of the CPU 1. In that case, when the amount of heat generated by the CPU is small, a control may be executed to reduce the flow to save energy.

The reserve tank 6 is basically intended to store the coolant. In addition to this purpose, the reserve tank 6 may be provided with any of the following three functions. The first is a function to hold air in the tank when evaporation of water reduces the amount of coolant and results in air entering the cooling system. The second is an ion exchange function for the coolant realized by filling an ion exchange resin or the like in the tank. This can prevent a possible corrosion of a metal such as the cooling pipe 8 due to metal ions in the coolant. The third is an access port function used to supply the coolant from outside into, or discharge it from, the circulating system.

The heat radiation unit 200 may be provided with a tube attach/detach mechanism 18, which has a water-leakage prevention mechanism and is easy to be attached and detached, and the pump 5 may be provided with a detachable connector 20 for providing an electric power or a control signal from the PC system unit 100. With this arrangement, the heat radiation unit 200 including the pump 5, the reserve tank 6, the cooling pipe 8 and the propeller 9 can easily be mounted to or dismounted from the PC system unit 100.

Figure 2:
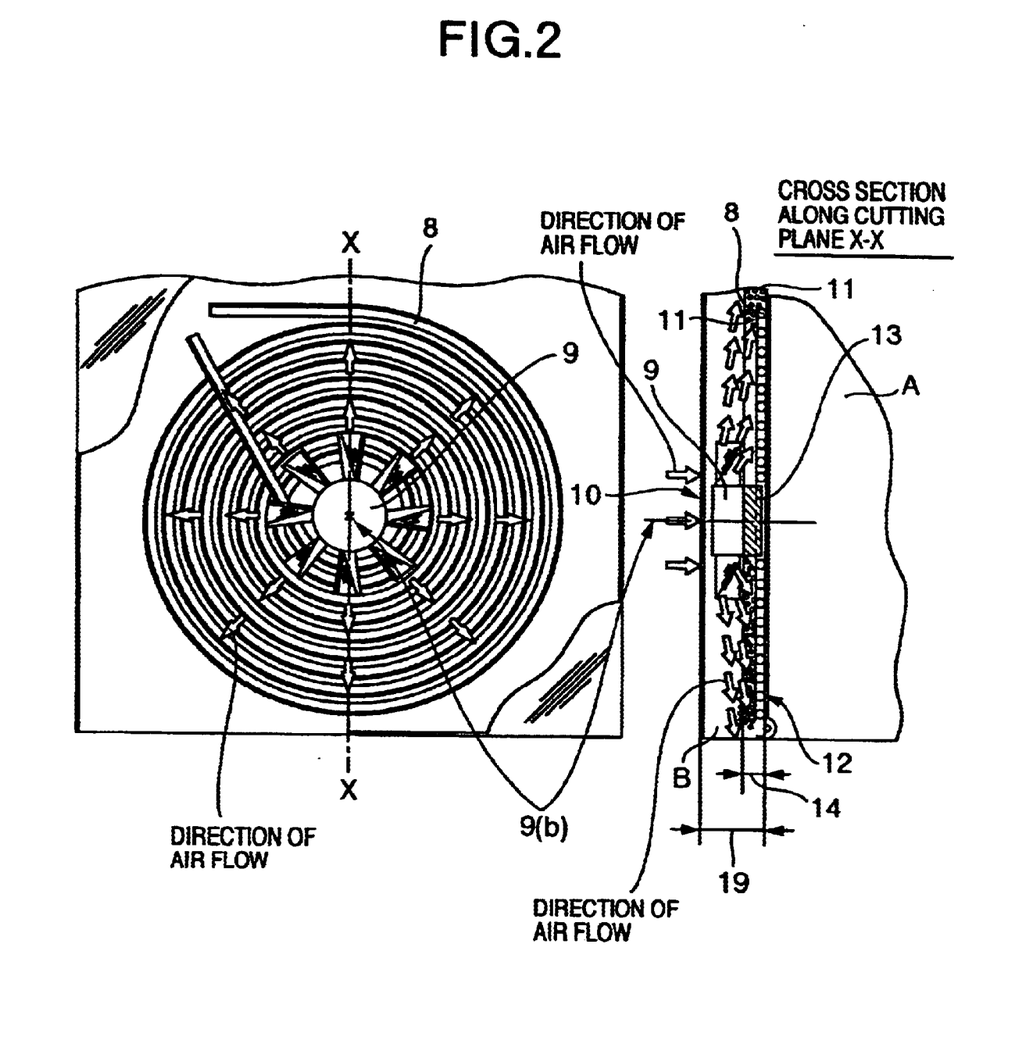
FIG. 2 is a plan view and a cross-sectional view showing a heat radiation unit 200 of the embodiment of the invention.

Next, the cooling pipe 8 and the propeller 9 will be described in detail with reference to FIG. 2.

In this embodiment, the cooling pipe 8 is spirally wound around the propeller 9. The cooling pipe 8 is made from a metal pipe 5 mm in inner diameter and 6 mm in outer diameter and its total length is about 4 m. The cooling pipe 8 is thermally and fixedly connected by caulking or soldering to a wall surface 12 of the PC system unit 100. Hence, the side surface of the PC system unit 100 also serves as a heat spreader. The coolant flows in the cooling pipe 8 in a direction from an inner circle thereof to its outer circle. This is to ensure that the hot coolant coming out of the heat-receiving header 4 passes nearest to the propeller 9 so that it is cooled by faster air near the propeller, improving the cooling efficiency.

The propeller 9 is arranged at the center of the spiral cooling pipe 8. In this embodiment, as shown in an X—X cross section of FIG. 2, a motor 13 side of the propeller 9 is in contact with the wall surface 12 of the PC system unit 100. In this embodiment there is a gap 14 of 11 mm between the propeller 9 and the wall surface 12 of the PC system unit 100.

Next, airflow delivered by the propeller 9 will be explained. Outside fresh air is drawn into an inlet 10 formed at the top of the propeller 9. The air thus taken in is blown against the cooling pipe 8 disposed in an outflow path of the propeller 9 and against the wall surface 12 of the PC system unit 100 which is thermally connected with the cooling pipe 8. At this time, it should be noted that the propeller 9 is made as an axial-flow fan propeller. This type of propeller improves the cooling efficiency by blowing against the cooling pipe 8 a radial air flow several tens of degrees inclined downward from the air intake plane. The propeller 9 may of course be a centrifugal fan propeller. The air blown against the cooling pipe 8 flows through a path confined by the external wall surface of the heat radiation unit 200 and the wall surface 12 of the PC system unit 100 and is discharged outside from surfaces including discharge holes 11 of the heat radiation unit 200.

The path of the cooling airflow has a height 19 (30 mm) of the heat radiation unit 200, which is the height of the outflow path, minus the size (5 mm) of the cooling pipe 8. This cooling airflow path has a small air resistance and thus provides a structure with reduced noise in which the propeller airflow is not easily reduced. Further, by spirally winding the cooling pipe 8 around the propeller shaft 9b as a center, a part of the cooling pipe 8, in which hot coolant is flowing, can be arranged concentratedly in a radial, faster airflow area directly below the propeller 9, thus assuring a high cooling performance. Further, by increasing the number of turns of the spiral tube, the heat radiation capability can easily be improved. In addition, since the air flow generated by the propeller 9 is also blown against the wall surface 12 of the PC system unit 100 that serves as a heat spreader thermally connected with the cooling pipe 8, the cooling performance is further improved.

In this embodiment, when the propeller 9 including the motor is formed 25 mm thick and 110 mm in propeller diameter, 80 W of heat can be cooled by the propeller 9 at a revolution speed of 2000 rpm or less.

Figure 3:
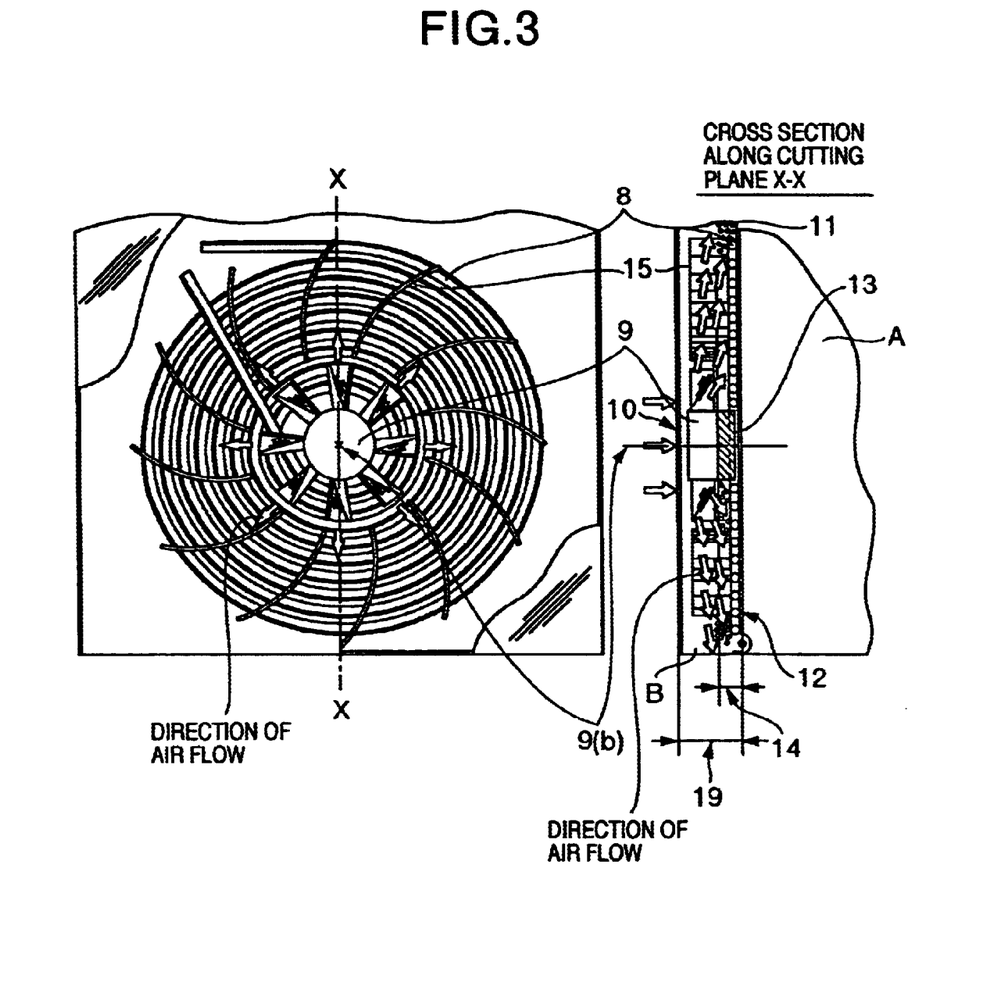
FIG. 3 is a plan view and a cross-sectional view showing a heat radiation unit 200 of another embodiment with cooling fins.

FIG. 3 shows another embodiment. This embodiment has vertical heat radiation fins 15 thermally connected to the cooling pipe 8, in addition to the construction of the heat radiation unit 200 of the foregoing embodiment. These heat radiation fins 15 are adjusted in a mounting angle so as not to reduce the propeller airflow and not to increase noise due to turbulent flow. They are also curved in the direction of propeller rotation to conform to the airflow and thermally connected to the cooling pipe 8. This arrangement increases the cooling area, improves the cooling efficiency and reduces noise.

Figure 4:
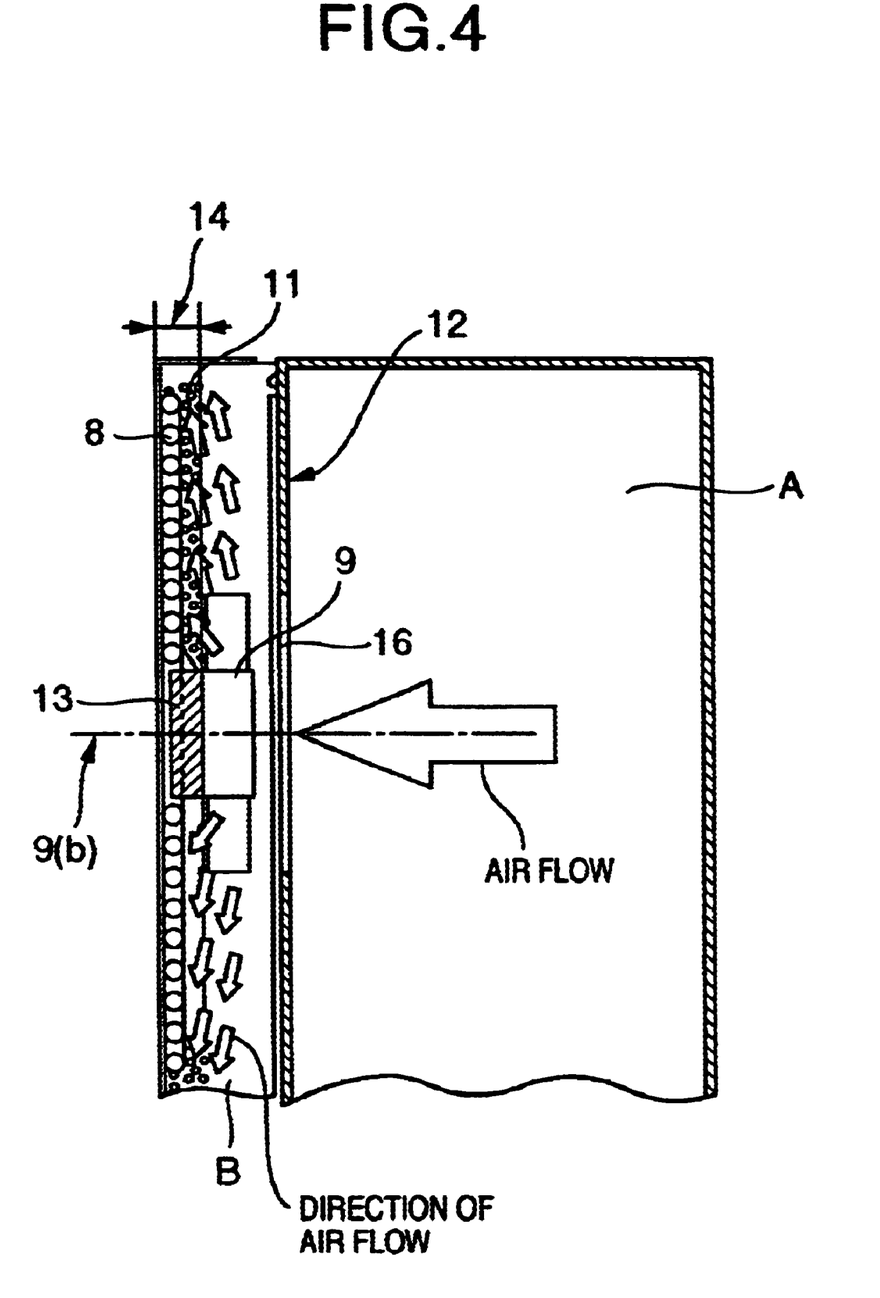
FIG. 4 is a schematic view showing still another embodiment in which a propeller draws air from a case.
Figure 5:
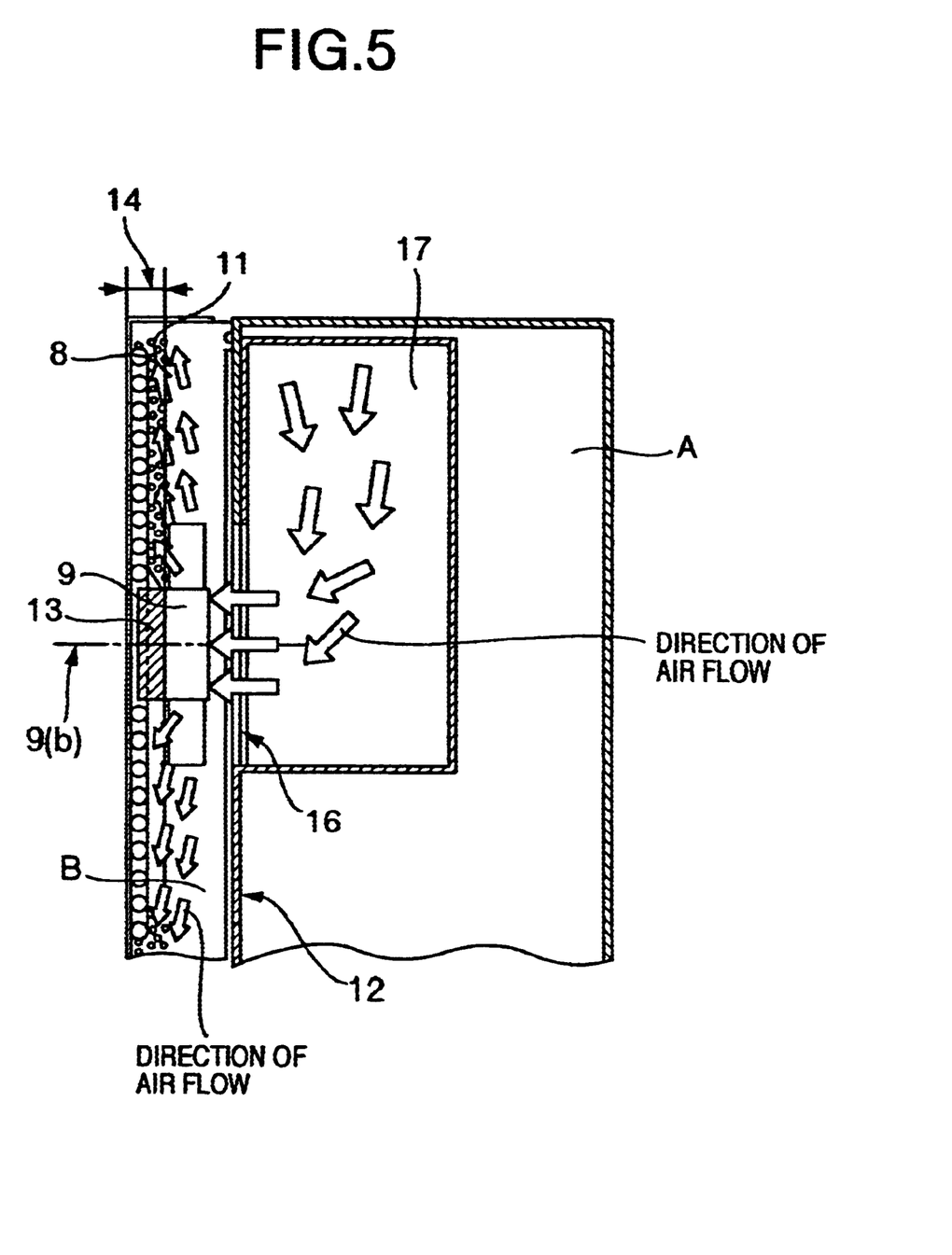
FIG. 5 is a schematic view showing further another embodiment in which a propeller also discharges air from a power supply unit.

In the foregoing embodiments, the propeller 9 and the cooling pipe 8 are installed on the side of the case of the PC system unit 100 to draw air from outside. The air may be taken in from the PC system unit 100, as shown in FIG. 4. In this case, the propeller 9 and the cooling pipe 8 are disposed on the opposite side, i.e., on the side of outside air. With a ventilation opening 16 formed in the side surface of the case of the PC system unit 100 in this way, it is possible not only to cool the propeller 9 and the cooling pipe 8 but also to ventilate the interior of the case of the PC system unit 100. For example, air can be exhausted from within a power supply unit 17, as shown in FIG. 5. In this method because the back of the wall surface on which the cooling pipe 8 is fixedly mounted is exposed to outside air, a natural heat dissipation effect can also be expected of this wall surface. Further, by forming a heat sink on the wall surface or forming the wall surface itself in the shape of a heat sink, the cooling capacity can be further improved.

Figure 6:
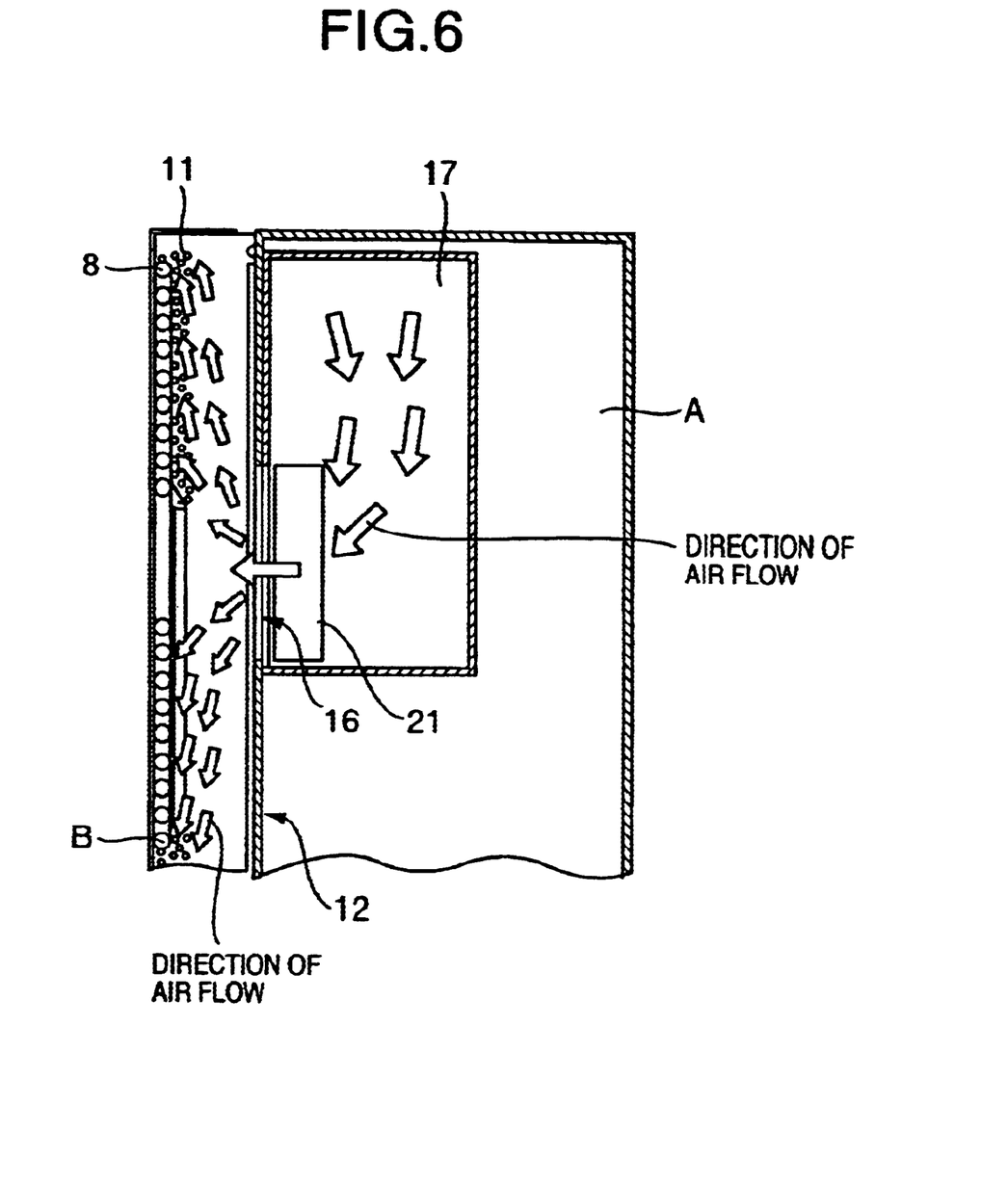
FIG. 6 is a schematic view showing further another embodiment in which a power supply unit fan is used for generating cooling air.

In an example of FIG. 6, a power supply unit fan 21 is utilized for the forced cooling of the spiral cooling pipe 8 of the foregoing embodiments. In this way the spiral cooling pipe 8 may be cooled by an air flow generated by the fan 21 arranged at an arbitrary position.

Figure 7:
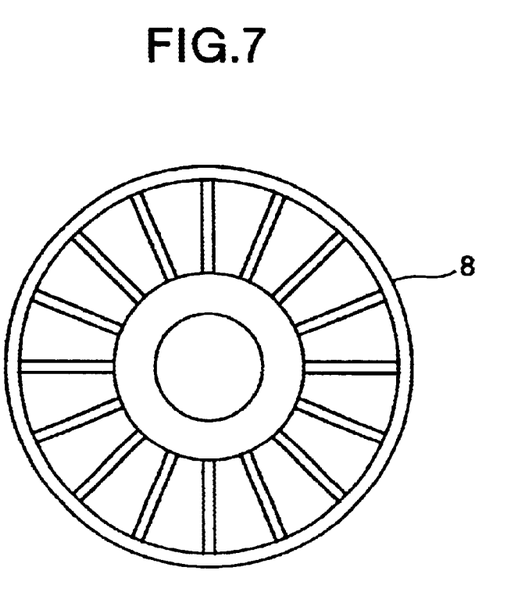
FIG. 7 is a schematic diagram showing another embodiment of a cooling pipe.

While in the above embodiments the cooling pipe 8 has been described to be spiral, the shape of the cooling pipe 8 is not limited to this. For example, as shown in FIG. 7, the pipe may be arranged radially so that a hot liquid coolant is introduced from the central portion of the cooling pipe 8 and discharged from its outer peripheral portion. In this case, the cooling air is applied to the central portion of the cooling pipe 8 so that the air flows along the pipe toward its outer peripheral portion.

Figure 8:
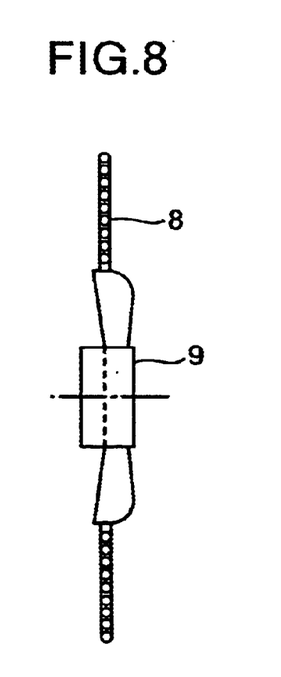
FIG. 8 is a schematic diagram showing another arrangement position of the cooling pipe.

Although in the foregoing embodiments the cooling pipe 8 has been described to be thermally connected to the wall surface of the PC system unit 100 or heat radiation unit 200, the mounting position of the cooling pipe 8 is not limited to this example. The cooling pipe 8 may be mounted as shown in FIG. 8. In FIG. 8 the cooling pipe 8 is arranged in the circumferential direction of the propeller 9. In this case, the cooling airflow is delivered on both sides of the cooling pipe 8, increasing the cooling area as compared with the other embodiments and thereby improving the cooling efficiency.

As described above, according to the invention it is possible to realize an information processing apparatus having a thin, quiet cooling structure with a high cooling performance.

It will be further understood by those skilled in the art that the foregoing description has been made on the embodiments of the invention and that various changes and modifications may be made in the invention without departing from the spirit of the invention and the scope of the appended claims.

What is claimed is:

1. A cooling device for a computer comprising:
    a heat receiving unit having a heat receiving head provided in the computer for transferring heat from a heat generating portion of the computer to a liquid coolant therein and a tube connected to the heat receiving head and filled with the circulating liquid coolant; and
    a heat radiation unit provided outside of the computer and having a radiator connected to the tube and filled with the circulating liquid coolant and a cooling fan for air-cooling the radiator, the heat radiation unit being arranged parallel to a printed circuit board on which the heat generating portion of the computer is mounted.

2. A cooling device according to claim 1, wherein the radiator has a cooling pipe formed in a spiral shape so that the liquid coolant can flow from a central portion of the radiator toward its outer peripheral portion.

3. A cooling device according to claim 1, wherein the radiator has a cooling pipe formed in a radial shape so that the liquid coolant can flow from a central portion of the radiator toward its outer peripheral portion.

4. A cooling device according to claim 2, wherein the liquid coolant, which has received heat from the heat receiving head, flows into the central portion of the radiator, and the liquid coolant, which has been cooled by the cooling fan, flows out from the outer peripheral portion of the radiator.

5. A cooling device according to claim 3, wherein the liquid coolant, which has received heat from the heat receiving head, flows into the central portion of the radiator, and the liquid coolant, which has been cooled by the cooling fan, flows out from the outer peripheral portion of the radiator.

6. A cooling device according to claim 1, wherein the cooling fan is an axial-flow fan.

7. A cooling device according to claim 1, wherein the cooling fan is a centrifugal fan.

8. A cooling device according to claim 6, wherein the cooling fan is arranged at a center of the radiator to deliver cooling air to the central portion of the radiator.

9. A cooling device according to claim 7, wherein the cooling fan is arranged at a center of the radiator to deliver cooling air to the central portion of the radiator.

10. A cooling device according to claim 8, wherein the radiator is arranged parallel to a path of the cooling air from the cooling fan.

11. A cooling device according to claim 8, wherein the radiator and a wall surface of a case of the heat radiation unit are spaced with a gap therebetween, and the cooling fan delivers the cooling air into the gap.

12. A cooling device for an information processing apparatus comprising:
    a heat receiving unit having a heat receiving head for transferring heat from a heat generating portion to a liquid coolant therein and a tube connected to the heat receiving head and filled with the circulating liquid coolant; and a heat radiation unit having a radiator made from a cooling pipe connected to the tube, the cooling pipe being filled with the circulating liquid coolant and formed in a spiral or radial shape so that the liquid coolant flows in the cooling tube from a central portion thereof toward its outer peripheral portion, the heat radiation unit taking in cooling air perpendicularly from the central portion of the radiator and exhausting the air in an outer circumferential direction of the radiator.

13. A cooling device according to claim 12, further comprising a cooling fan for exhausting air from within the information processing apparatus, wherein the cooling air is delivered by the cooling fan and exhausted out from the heat radiation unit.

14. A cooling device according to claim 13, wherein the cooling fan is commonly used as a cooling fan of a power supply unit of the information processing apparatus.

15. A cooling device for an information processing apparatus comprising:

a heat receiving unit having a heat receiving head for transferring heat from a heat generating portion to a liquid coolant therein and a tube connected to the heat receiving head and filled with the circulating liquid coolant; and a heat radiation unit having a radiator made from a cooling pipe connected to the tube, the cooling pipe being filled with the circulating liquid coolant and formed in a spiral or radial shape so that the liquid coolant flows in the cooling tube from a central portion thereof toward its outer peripheral portion, the heat radiation unit taking in cooling air perpendicularly from the central portion of the radiator and exhausting the air in an outer circumferential direction of the radiator, the radiator being in contact with an inner side of an external wall surface of the heat radiation unit and, together with a wall surface of the information processing apparatus, forming a path of the cooling air, the radiator being cooled by the cooling air, heat of the radiator being dissipated outside through the external wall surface.

16. A cooling device according to claim 15, wherein the radiator is arranged along a vertical external wall surface and the heat of the radiator is dissipated from the wall surface of the apparatus out into open air by natural convection.

17. A cooling device according to claim 1, wherein the heat generating portion is a CPU.

18. A cooling device according to claim 12, wherein the heat generating portion is a CPU.

19. A cooling device according to claim 15, wherein the heat generating portion is a CPU.

* * * * *